July 29, 1952  E. E. SIVACEK  2,604,879
RECIPROCATING PISTON TYPE FLUID MOTOR
Filed Aug. 13, 1945  4 Sheets-Sheet 1

INVENTOR.
Emil E. Sivacek.
BY
Harness, Dickey & Pierce
ATTORNEYS.

July 29, 1952        E. E. SIVACEK        2,604,879

RECIPROCATING PISTON TYPE FLUID MOTOR

Filed Aug. 13, 1945        4 Sheets-Sheet 2

INVENTOR.
Emil E. Sivacek.
BY
Harness, Dickey & Pierce
ATTORNEYS.

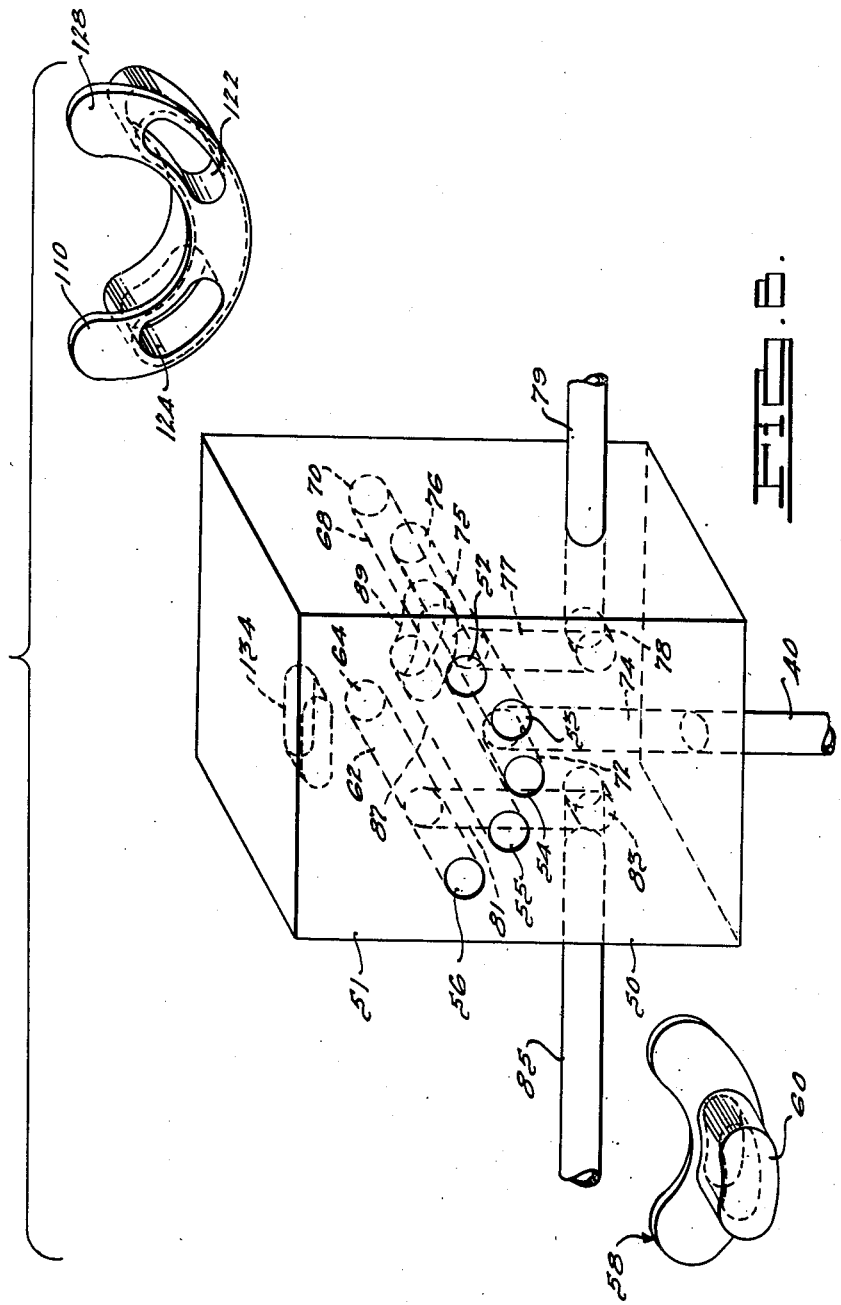

July 29, 1952          E. E. SIVACEK          2,604,879
RECIPROCATING PISTON TYPE FLUID MOTOR
Filed Aug. 13, 1945          4 Sheets-Sheet 4
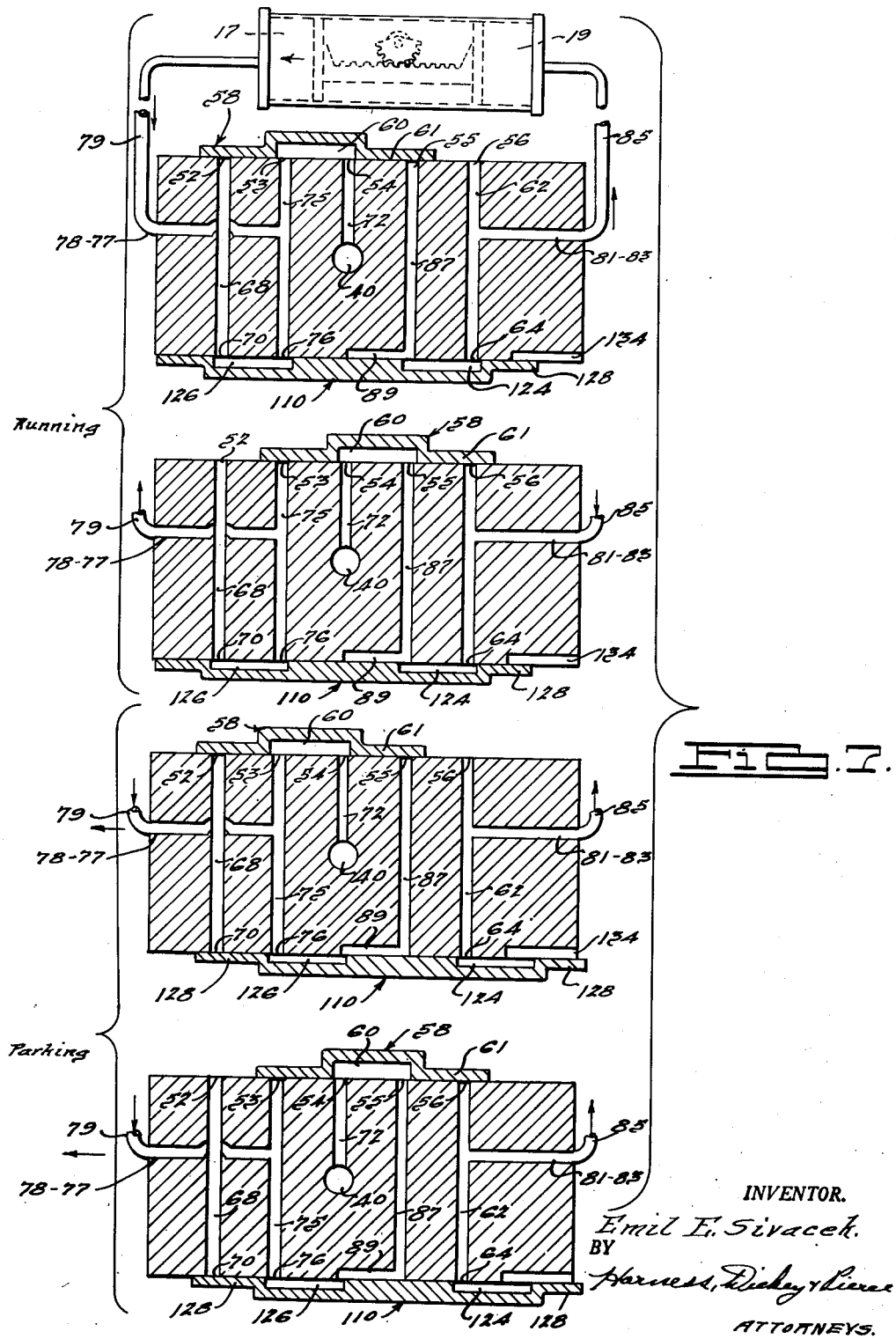
INVENTOR.
Emil E. Sivacek.
BY
Harness, Dickey & Pierce
ATTORNEYS.

Patented July 29, 1952

2,604,879

UNITED STATES PATENT OFFICE 2,604,879

RECIPROCATING PISTON TYPE FLUID MOTOR

Emil E. Sivacek, Ann Arbor, Mich., assignor to King-Seeley Corporation, Ann Arbor, Mich., a corporation of Michigan Application August 13, 1945, Serial No. 610,557

1 Claim. (Cl. 121—164)

The present invention relates to fluid motor mechanisms, and particularly, is directed to the provision of fluid motor mechanisms embodying improved control means for automatically bringing the motors to rest at terminal positions which may be at or beyond the normal limits of travel of the motors. The fluid motor mechanisms, while not limited thereto in their application, have a particular utility in connection with automotive windshield wiper systems.

Principal objects of the present invention are to provide fluid motor mechanisms of the above generally indicated type, which are simple in arrangement, economical of manufacture and assembly and which are reliable and efficient in operation; to provide such constructions of the reciprocating type, employing automatically operated reversing valve mechanism, and further employing selectively operable parking valve mechanisms which, upon being operated to parking position, establish fluid circuits which cause the motor to automatically move to and come to rest at a terminal position; to provide such constructions in which the parking valve modifies the circuits established, by the reversing valve mechanism, between the motor and the source of power, in such a way as to cause the above movement to terminal position; and to generally improve the construction and operation of fluid motor mechanisms of the above generally indicated type.

With the above as well as other and more detailed objects in view, which appear in the following description and in the appended claim, a preferred but illustrative embodiment of the invention is shown in the accompanying drawings, throughout the several views of which corresponding reference characters are used to designate corresponding parts and in which:

Figure 6 is an exploded view in perspective of the reversing and control valve elements; and Figure 7 is a diagrammatic view, illustrative of the various running and parking circuits of the present motor mechanism.

Figure 1:
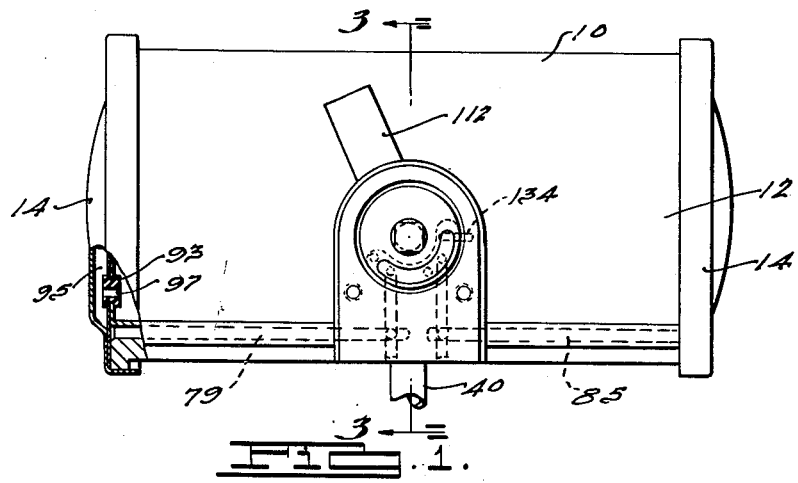
Figure 1 is a view in side elevation of a fluid motor embodying the invention.

It will be appreciated from a complete understanding of the present invention, that, in their broader aspects, the improvements thereof may be embodied in fluid motor mechanisms of widely differing types and sizes and designed for widely differing applications. In an illustrative but not in a limiting sense, the present improvements are herein disclosed as being embodied in a fluid motor of the double piston type, an example of which is disclosed and claimed in Patent No. 2,354,189, granted July 25, 1944, to Rupert B. Bell. By way of example, such motors are well adapted for use in automotive windshield wiper systems.

Referring to the drawings, the improved motor 10 comprises generally a cylindrical housing or cylinder 12 which is provided with removable end closures 14. Cylinder 12 slidably receives a piston assembly, comprising a pair of spaced pistons 16, which are rigidly secured, as by studs 18, to a connecting rack 20. The output shaft 22 of the motor, which is rotatably journaled in bearings 24 and 26 provided therefore in the cylinder 12, has fixed thereon, as by a pin 27, a gear segment 28 which continuously meshes with the rack 20. Accordingly, reciprocating movements of the piston assembly are translated into oscillatory or rocking movements of the shaft 22. In the illustrated embodiment, shaft 22 is provided with a crank 34, which adapts it for connection to the mechanism to be operated by the motor.

It will be appreciated that the piston movements are effected by applying differential pressures in the chamber spaces 17 and 19 between the pistons 16 and the corresponding end closures 14, the space between pistons 16 being continuously vented to atmosphere in the illustrated instances.

These differential pressures may, of course, be obtained from any suitable source. For example, in utilizing the present motor to drive a windshield wiper system, the pressure differential may be the difference between atmospheric pressure and a subatmospheric pressure obtained in usual fashion by connecting the motor inlet 40 to the intake manifold of the associated engine.

In accordance with the present invention, motor 10 is provided with a pair of valve mechanisms which, respectively, control the normal reciprocating movements thereof and the stopping or parking action thereof. One of these valve mechanisms is of the automatically operated type, which responds to the arrival of the piston assembly at its normal limits, and reverses the applied fluid pressure differential. The other valve mechanism is manually controlled, and, when operated to the parking position, serves to establish fluid connections through the reversing valve mechanism which cause the motor to move to and come to rest at a terminal position which may be at any desired distance beyond a predetermined one of the normal limits.

Generically, any of a variety of automatic reversing valve mechanisms may be utilized. The illustrated valve mechanisms embody the invention of the aforesaid Patent No. 2,354,189. More particularly, the present reversing valve mechanism comprises a valve seat 50, which is located at one face of a valve block 51, and which is provided with a series of five arcuately distributed ports 52, 53, 54, 55, and 56. A hood valve 58, having a single blind cavity or pocket 60 is disposed for movement between the two positions shown in the upper two diagrammatic views of Figure 7. In the upper one of these views, the cavity 60 bridges and consequently interconnects ports 53 and 54; the flange 61 overlies the covers ports 52 and 55; and the remaining port 56 is exposed to atmosphere. In the second view of Figure 7, which corresponds to the position shown in Figure 2, cavity 60 bridges and so interconnects ports 54 and 55; the flange 61 bridges and so closes off ports 53 and 56; and the remaining port 52 is exposed to the atmosphere.

As appears most clearly in Figures 6 and 7, reversing valve port 56 continuously communicates, by way of a through passage 62, with a port 64 which opens through the face of the control valve seat 66. Port 52 similarly communicates, by way of a through passage 68, with a port 70 which opens through the face of the control valve seat 66. The center or suction port 54 continuously communicates, through interconnecting passages 72 and 74, with the previously mentioned suction line 40.

Reversing valve port 53 continuously communicates, by way of a through passage 75, with a port 76 which opens through the control valve seat. Passage 75 is intersected by a vertical passage 77, which continuously communicates, through a short lateral passage 78, with a longitudinally extending passage 79, which communicates with the right-hand piston chamber 17 as viewed in Figure 2. Similarly, the previously mentioned through passage 62 is intersected by a vertical passage 81, which continuously communicates, through a short lateral passage 83, with a longitudinally extending passage 85, which opens into the left-hand piston chamber 19, as viewed in Figure 2.

The remaining reversing valve port 55 continuously communicates, by way of a through passage 87, with a pocket 89 provided in the face 66 of the control valve.

Coming now to the operating means for the automatic reversing valve, hood valve 58 is carried by a valve actuator or kicker 80 which is pivotally mounted on a trunnion 82, and which is provided with an upwardly directed arm 91. The lower portion of kicker 80 is enlarged, and is provided with an arcuate slot 84 which receives, and is somewhat longer than the rearwardly projecting portion which defines the cavity 60. A spring 86, also carried by trunnion 82, bears against the back of the flange 61 of valve 58; and holds valve 58 on its seat. The upper end 91 of arm 80 carries a rubber buffer 88, which cooperates with spaced stop shoulders 90 provided on the valve block 51, to limit the throw of the kicker 80.

Figure 2:
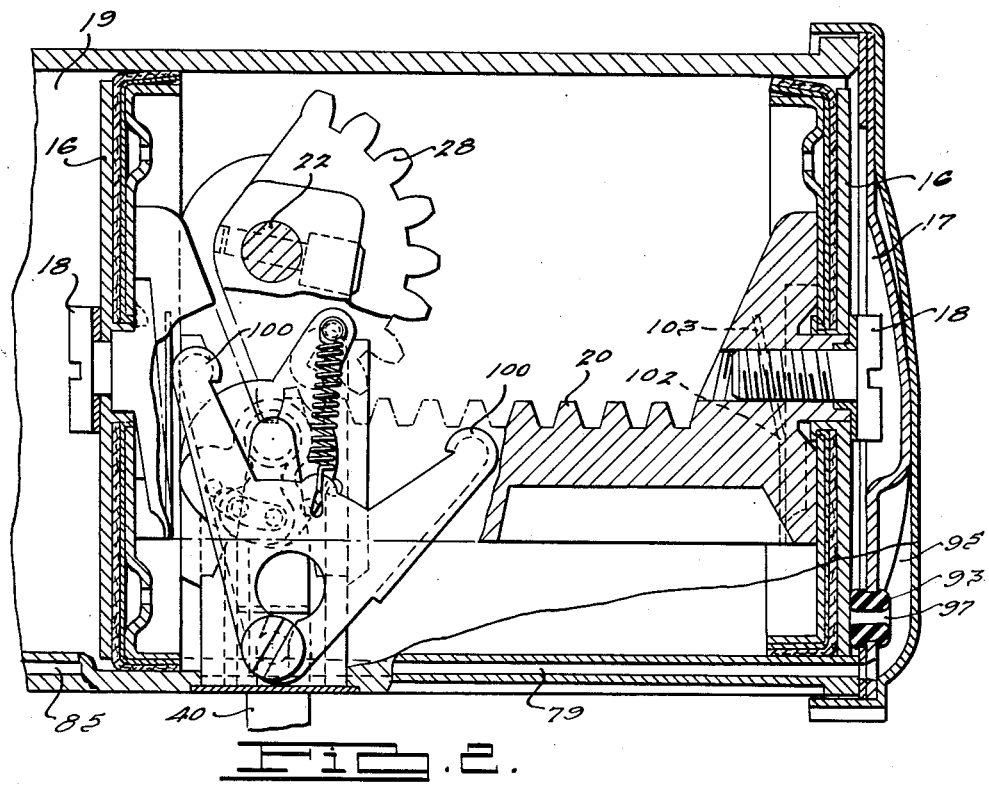
Figure 2 is a view in transverse section, taken along the line 2—2 of Figure 3.
Figure 3:
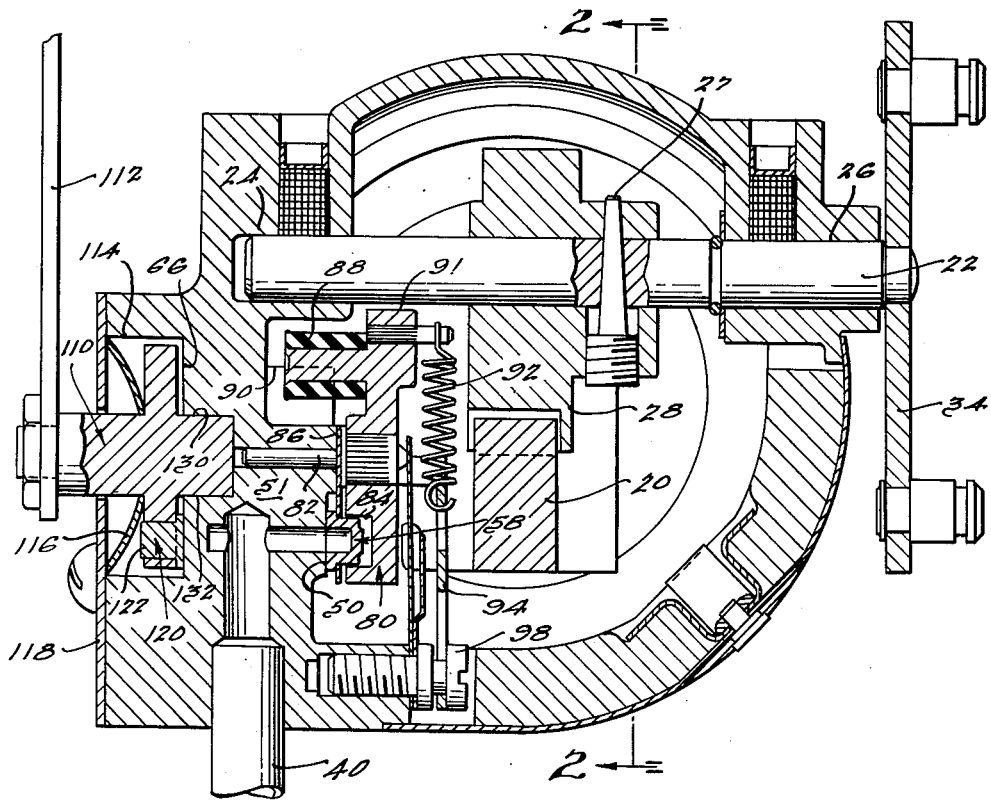
Figure 3 is a view in transverse section, taken along the line 3—3 of Figure 1.
Figure 4:
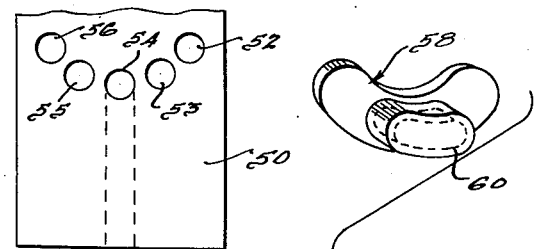
Figure 4 is an exploded view of the reversing valve seat and the reversing valve element.
Figure 5:
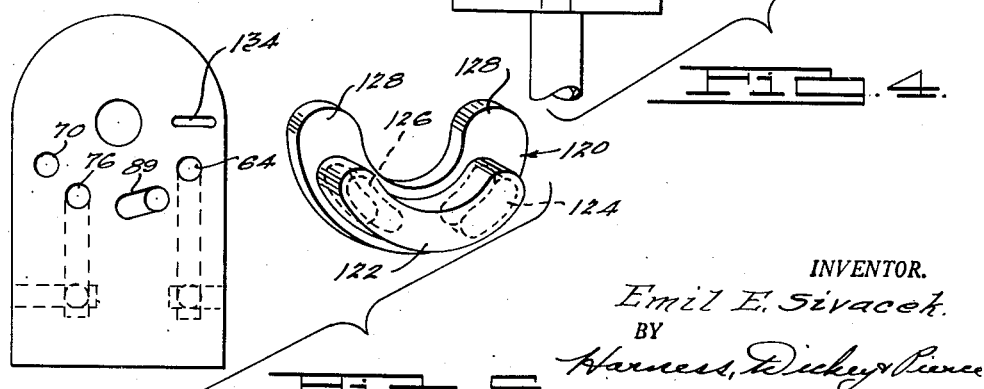
Figure 5 is an exploded view of the control valve seat and the control valve element.

Kicker 80 is connected, by a tension spring 92, to a pivoted spring carrier 94. Spring carrier 94 is pivotally supported, by means of a pin 98, and is provided with spaced arms 100 which are disposed to be engaged and moved by abutments 102 carried by the rack 20. These abutments 102 may have leaf springs 103 associated therewith to give resilient characteristics to the initial engagement between these abutments and the carrier 94. It will be appreciated that as the piston assembly moves to the left, as viewed in Figure 2, the right-hand piston carried abutment 102 ultimately engages the right-hand arm 100 of the spring carrier 94, initiating a swinging movement thereof which ultimately carries the lower end of the spring 92 past the over-center position. Such carrier movement also causes the upper and laterally turned end 105 of the corresponding carrier arm to engage and positively move the upper end 91 of the kicker 80, initiating a snap-over movement of the latter. During the course of this snap-over movement, the end of slot 84 engages valve 58 and snaps it to its opposite position. During rightward piston movement, a reverse action takes place, resulting in snapping the valve 58 to the operating position shown in Figure 2. Both right-hand and left-hand valve actions occur at, and establish, normal limits of the piston movement. The motor is shown in Figure 2 at a stopping position, in which the right-hand piston 16 is immediately adjacent its corresponding cylinder closure 14, which position is beyond the normal right-hand limit of travel of the motor, as established by the automatic reversing valve mechanism. Such over travel is caused, as described below, by action of the manual control valve 110; and is accommodated by the automatic reversing valve, since during the over travel, the spring carrier 94 is simply pivoted by the corresponding abutment 102, to a point beyond the point at which the snap action of kicker 80 takes place.

The control valve 110 is illustrated herein as being of the rotatable type, having a manually controlled operating handle 112. Valve 110 is received in a pocket 114 provided therefor in the outer face of the valve block 51, and is retained on its seat 66 by a spring 116, which is held in place by the removable cover plate 118. Valve 110 comprises a hood-like valve element 120, having a projecting portion 122, which defines a pair of arcuately spaced blind pockets 124 and 126; and is also carried with circumferentially projecting flange portions 128. The projection 122 is received in a slot provided therefor in the body of the control valve 110. Valve 110 is provided with an axially projecting cylindrical portion 130, which is rotatably journaled in an axial bore 132 provided therefor in the valve block 51.

By manipulating the handle 112, valve 110 is movable between the parking position shown in Figure 1, and in the lower two views of Figure 7; and the running position shown in the upper two views of Figure 7.

The previously identified control valve ports 64, 70, 76, and 89 are arcuately arranged, as in the case of the reversing valve ports, and in addition, the control valve seat 66 is provided with a blind pocket 134.

In the running positions, control valve pocket 126 bridges and interconnects passages 68 and 75; pocket 124 bridges and interconnects passages 62 and 87; and the flange 128 of the control valve element bridges and closes off the blind pocket 134. In the parking or stopping position on the other hand, pocket 126 bridges and interconnects passages 75 and 87; and pocket 124 bridges and interconnects passage 62 and the pocket 134. It is noted that pocket 134 extends laterally beyond the flange 128 of the control valve element, so that the outer end portion is continuously exposed to atmosphere. In the just-mentioned parking position, accordingly, pocket 124 vents passage 62 to atmosphere. Finally, in the parking position, the flange 128 closes off the remaining valve block passage 68.

It is believed that the operation of the present motor may best be understood with particular reference to the diagrammatic views of Figure 7.

As previously mentioned, the motor normally parks at its right-hand limit of travel as viewed in Figure 2, which corresponds to its left-hand limit of travel as viewed in Figures 1 and 7. Under such conditions, the automatic reversing valve is in a position in which it tends to establish circuits which cause the piston assembly to move to the right as viewed in Figure 7, which is the position of the reversing valve in the second view of Figure 7. Accordingly, if the manual valve 110 is moved from parking position to running position, the fluid circuits shown in the second view of Figure 7 are immediately established. In this figure, the right-hand piston chamber 19 is connected to the suction line 40, through a circuit which extends through passage 85, a portion of passage 62, control valve pocket 124, passage 87, reversing valve pocket 60 and passage 72 to the suction line 40. Under the same conditions, the left-hand chamber 17 is connected to atmosphere through passage 79, a portion of passage 75, control valve pocket 126, and passage 68, port 56 whereof is exposed to atmosphere. When the right-hand limit of travel is reached, valve 58 reverses its position, as previously described, establishing the fluid circuits shown in the top view of Figure 7, in which it is believed to be obvious that chamber 19 is connected to atmosphere through the now exposed port 56 associated with passage 68; and chamber 17 is connected to the suction line 40 through a circuit which includes valve pocket 60, a portion of passage 75, and passage 79 into chamber 17.

So long, therefore, as the control valve 110 occupies the running position, motor 10 is caused to reciprocate between its normal left-hand and right-hand positions.

To effect a parking of the motor, valve 110 may be moved to the parking position, shown in the lower two views of Figure 7, at any time, regardless of the direction of travel of the motor. If the control valve 110 is moved to parking position, while the motor is traveling toward the parked position (third view, Figure 7), no change in the motor movement is effected. In fact, the only circuit change which is produced by this movement of the control valve is that an additional atmospheric connection for chamber 19 is provided through the now bridged passage 62 and venting pocket 134. When the motor reaches its normal left-hand limit of travel, reversing valve 60 makes it normal throw-over movement, establishing the circuits shown in the bottom view of Figure 7. In this view, chamber 17 remains connected to suction through a circuit which extends from the suction line 40, passage 72, pocket 60, passage 87, pocket 126, a portion of passage 75, and passage 79 into chamber 17. At the same time, chamber 19 remains connected to atmosphere through a circuit which extends through passage 85, a portion of passage 62, pocket 124, and venting pocket 134 to atmosphere. The throw-over action of the reversing valve at the left-hand limit is thus ineffective to reverse the application of pressure to the motor, and the latter continues towards its left-hand or parking position. When such position is reached, the left-hand piston 16 seats against and closes off the passage 97 which, as previously described, interconnects passage 79 with the left-hand piston chamber 17. This engagement holds the piston assembly in the parking position with a suction effect, and also resiliently brings the motor to rest.

If, on the other hand, the parking valve 110 is moved to parking position while the motor is moving away from its parking position, such movement interrupts the fluid circuits shown in the second view of Figure 7, and immediately reestablishes the connections shown in the bottom view of Figure 7. This action, of course, causes the motor to immediately stop and re-start in the opposite direction, toward the parking position. Under these conditions, no throw-over action of the reversing valve 58 takes place when the normal left-hand limit is again reached, for the reason that valve 58 is already in the position to which it would normally be moved upon arrival at the normal left-hand limit. Accordingly, no change in the supply and venting circuits for the motor takes place at the normal left-hand limit and, as before, the motor continues to, and stops at, the left-hand terminal position.

Although only a single embodiment of the invention has been described in detail, it will be appreciated that various modifications in the form, number, and arrangement of the parts may be made without departing from the spirit and scope of the invention.

What is claimed is:

In a fluid motor, first and second members defining first and second chamber spaces and movable relative to each other back and forth between normal limits under the influence of a reversibly applied differential between higher and lower fluid pressures, means defining a supply passage adapted for connection to a source of one of said pressures and at least a pair of passages corresponding respectively to said chamber spaces, valve mechanism for controlling said motor, said valve mechanism including reversing valve element having a single cavity and being operable for connecting said supply passage alternately to said chamber passages and being automatically operable at said limits to reverse said connection, and control valve means operable, at any time regardless of the position of said reversing valve means to establish a connection, through said reversing valve cavity, of said supply passage to said motor which causes a said relative movement toward one of said limits.

EMIL E. SIVACEK.

REFERENCES CITED

The following references are of record in the file of this patent:

UNITED STATES PATENTS

| Number | Name | Date |
|---|---|---|
| 1,840,233 | Hueber | Jan. 5, 1932 |
| 2,218,719 | Richards | Oct. 22, 1940 |
| 2,310,750 | Schnell | Feb. 9, 1943 |
| 2,354,189 | Bell | July 25, 1944 |

FOREIGN PATENTS

| Number | Country | Date |
|---|---|---|
| 697,976 | France | Nov. 5, 1930 |
| 473,296 | Great Britain | Oct. 11, 1937 |